Patented Nov. 15, 1938

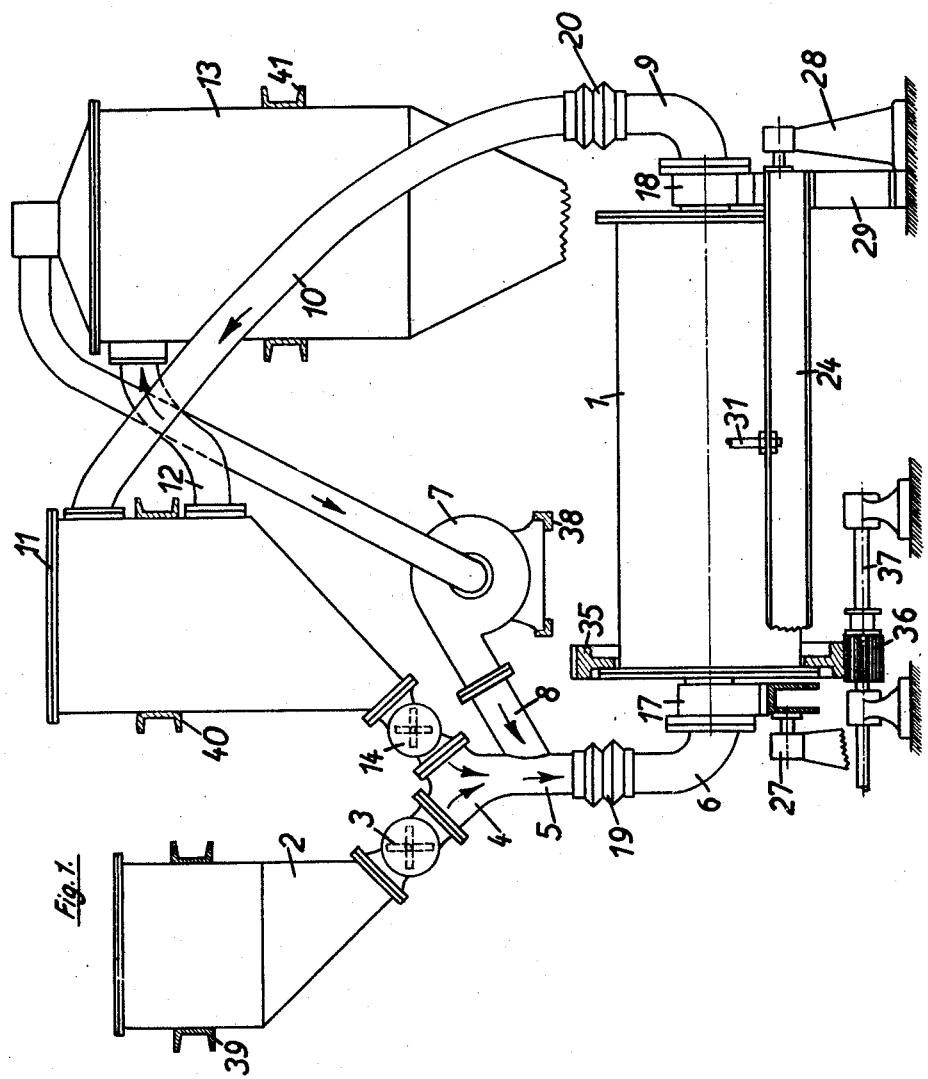

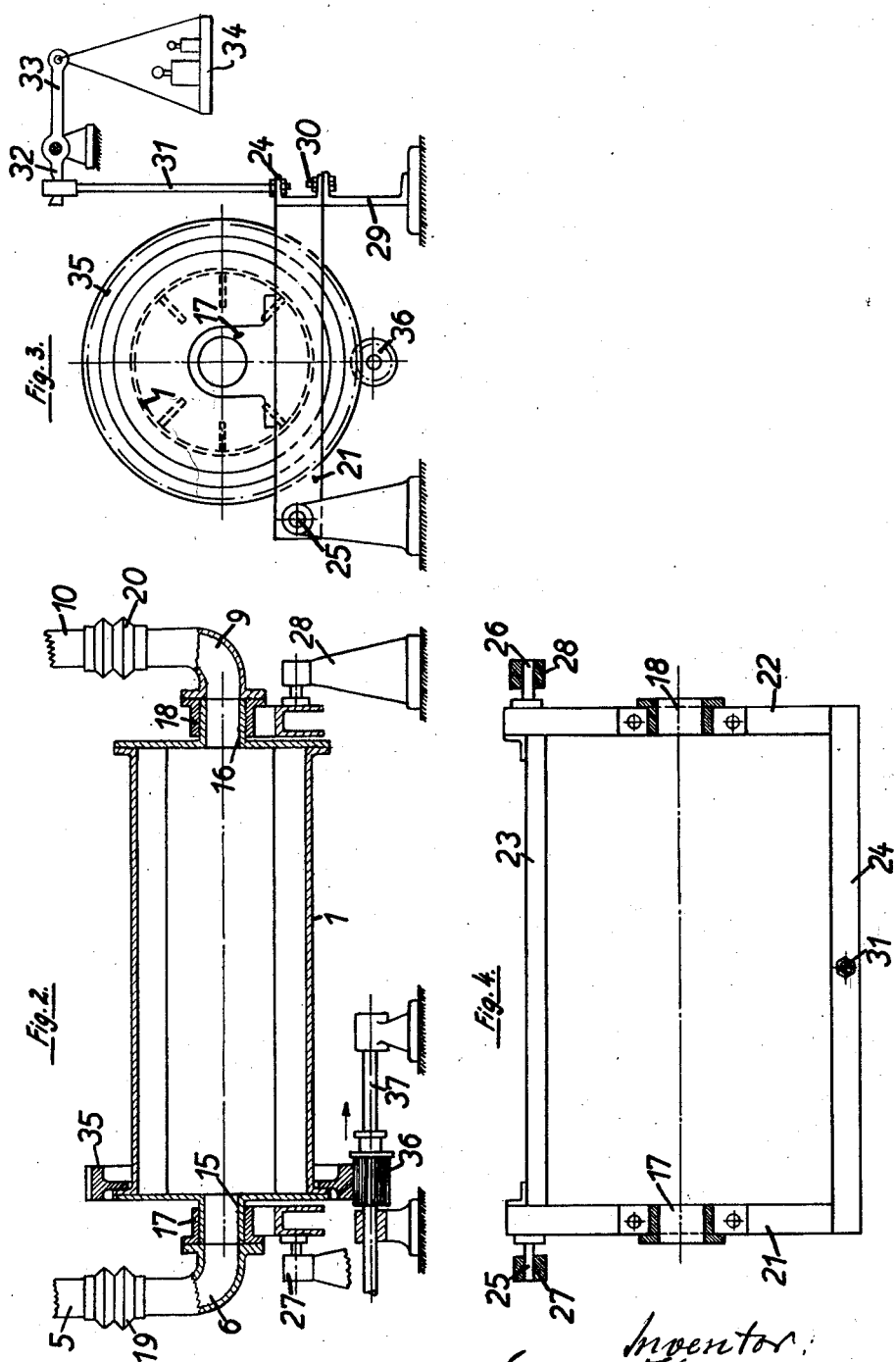

2,136,445

UNITED STATES PATENT OFFICE 2,136,445

APPARATUS FOR THE MANUFACTURE OF METAL POWDER

Erwin Kramer, Berlin, Germany, assignor to the firm Metallpulver A. G., Gerlafingen, Switzerland Application March 29, 1935, Serial No. 13,685
In Germany March 5, 1934

1 Claim. (Cl. 83—9)

My invention relates to the manufacture of fine metal powders, more especially pulverulent bronze, with the aid of steel balls, the movement of which can be brought about, for instance, in a rotary drum as the same is being rotated.

The object of the present invention is to design an improved apparatus so as to obtain a particularly abundant output in proportion to the metal converted into powder.

Extensive experiments have shown and proved that the quantitative output, as well as the quality of the product, depend greatly upon the ratio between the total weight of the steel balls used in the pulverizing operation and the amount of the metal particles introduced into the rotary drum to be converted into powder. This is true especially in regard to the quality of the product which depends also upon the cooperation of the steel-balls with an air-actuated sifting device, in that fluctuations of the air or wind are very likely to exert a detrimental influence.

In order to obtain a maximum yield it is highly important to keep the amount of the steel balls at a certain ratio relative to the amount of the metal to be treated, the most favorable ratio to be ascertained by tests. That is, however, connected with great difficulties, especially if the operation is to be carried out continuously with sifting-off of the finished metal particles. Working the metal particles in the drum in such a manner as to obtain the prescribed degree of comminution necessitates different lengths of time, on the one hand as regards the quality to be delivered, and on the other hand, as regards the fineness, the hardness and/or other properties not only of the bronze particles, but also of the starting material which may have very different resistibility as, for instance, in the case of aluminum foils.

Experiments to determine the amount of material to be introduced into the rotary drum in proportion to the amount of the finished metal powder to be withdrawn therefrom have not been successful as it is very difficult to determine the amount of the finished pulverulent metal during the operation. If the apparatus is operated, for instance, while sifting by a current of air is carried on, the amount of the finished product withdrawn from, or delivered by, the apparatus does not constitute a reliable guide for the amount of the product which the apparatus is to deliver in a certain predetermined length of time, since fine particles of the product tend to adhere to the inner surfaces of the several devices constituting the apparatus, which particles accumulate and then fall down suddenly onto the particles still in course of pulverization. Thus, the amount of pulverulent metal leaving the drum at any given time does not permit of judging the amount of material still in the drum, the less so, because errors in weighing cannot always be avoided.

The apparatus, according to the present invention has, therefore, been so designed as to enable the amount of material present in the rotary drum to be directly ascertained by a weighing operation of the drum together with its contents. The weight of the drum and the steel balls being practically always the same, it is easy to ascertain the amount of pulverulent metal present in the drum. However, it is nevertheless requisite to make use of certain precautionary measures in order to be completely successful.

The drum is supported in such a manner that it can be weighed without any disturbance of or by other parts of the machine, and that it need not be disconnected from the other parts especially where the apparatus is operated with a current of air for withdrawing the bronze powder from the drum. Designing the machine in this manner is important, especially when used for the manufacture of aluminum bronze, as the drum, etc., is, in that case, filled with a gas.

A machine or apparatus embodying my invention is illustrated diagrammatically and by way of example on the accompanying drawings on which Figure 1 is a side-view of the complete machine, Figure 2 an axial section through the drum, Figure 3 a front view of the drum, and Figure 4 a plan view of the members supporting the drum.

On the drawings, 1 denotes the rotary drum which contains small steel balls to operate upon the metal particles introduced into the drum. A supply of these particles is contained in a receptacle 2 which is connected with the drum by an approximately T-shaped tube 4 and a curved tube 6. Between the receptacle 2 and the tube 4 is a distributing device, for instance a rotary valve 3, or an equivalent device. A branch tube 3 connects the lower portion 5 of the tube 4 with a blower 7 producing an air current, with the aid of which the metallic particles are conveyed into the drum 1. The air flows through the drum and leaves it through the tube 9, carrying along with it the pulverulent metal produced in the drum by means of the steel balls. The mixture of air and pulverulent metal is conveyed through a tube 10 into a wind sifting device 11 into which it enters at the top. The lower portion of said device 11 is connected with one of the two branches of the tube 4 by means of a distributing device 14, similar to that shown at 3. In the device 11 the finished product is separated from the still unfinished material which, through the distributor 14 and the tubes 5 and 6, is returned to the drum to be treated over again. The finished pulverulent metal is carried away by the air currents through the tube 12 to a so-called cyclone 13, the top of which is connected with the blower 7 by a tube 42, whereas its lower end is connected to a receptacle (not shown) intended to receive the finished product.

The drum 1 is rotatably supported in bearings 17 and 18 by means of its hollow trunnions 15 and 16 (Fig. 2), and the tubes 6 and 9 which terminate at said trunnions are so connected to the same that they do not take part in the revolution of the drum. Between the parts 6 and 15 at one end of the drum and between the parts 9 and 16 at the other end of the drum there are provided packings that prevent the escape of air and of pulverulent metal. Between the pipes 9 and 10 is a bellows-like connecting member 20, and a similar member 19 is provided between the pipes 5 and 6 (Figs. 1 and 2).

The bearings 17 and 18 are secured to an oscillatory frame comprising transverse members 21 and 22 and longitudinal members 23 and 24 connecting said transverse members with one another. At one end of each of the said transverse members are trunnions 25 and 26 supported in upright bearings 27 and 28 (Figs. 2-4). The frame 21, 22, 23, 24 thus can rock about said bearings, that is to say, it can be raised and lowered together with the drum, the trunnions 25 and 26 acting as pivots. When the drum and the frame are in their normal operative position, the frame member 24 rests upon two brackets 29 (Fig. 3) with which it is during that time firmly connected by bolts and nuts as shown at 30 in Fig. 3.

From the middle portion of the frame member 24 extends upwardly a rod 31 (Fig. 3) which is suspended from one arm of a scale-beam 32, 33, from the other arm of which is suspended a pair 34 for the reception of weights, as shown. After the nuts and bolts 30 have been removed, the entire frame together with the drum can be tilted upwards thus enabling the weight of the parts concerned to be ascertained by means of the scale-beam. Practically, first of all the weight of the parts concerned is ascertained when the drum is empty. Then a certain known weight in the form of steel balls is introduced into the drum, and the entire weight is determined. It is, of course, now easy to ascertain the weight of the metal particles to be converted into pulverulent metal in the drum. I wish it to be understood that the balance 31, 32, 33, 34 is merely a diagrammatical representation. In practice there is made use of a decimal or of a centesimal balance, in which case it is easily possible to ascertain differences in weight of from ½ to 1 kg.

At one end of the drum is a large cog-wheel 35 (Figs. 1-3) which meshes with a pinion 36 mounted on a shaft 37 driven by any suitable source of power. When the frame 21, 22, 23, 24 and the brackets 29 are disengaged from one another so that the balance can act, the teeth of the driving members 35 and 36 become likewise disengaged from one another. It is to be preferred to make the pinion 36 shiftable upon the shaft 37 so that the drum can be disengaged from the pinion without any alteration of its position in vertical direction.

The bellows 19 and 20 may consist of such a soft material that their resistance in vertical direction when the drum together with the branches 6 and 9 is raised or lowered is practically zero. The operation of the blower 7 is preferably interrupted when a weighing is to be made.

Instead of air, any other suitable gas or gas mixture may be used as propelling agent in the machine, which is the case, for instance, when pulverulent aluminum is to be produced.

The connections between the pipes and the devices, etc., connected by them need not be broken when a weighing is to be made, there being no necessity therefor. Also the entrance of atmospheric air into the apparatus, into the system of tubes and the various devices connected thereby, is safely prevented, which is important especially as regards the drum.

38, 39, 40 and 41 are girders or frames supporting the blower 7, the receptacle 2, the sifting device 11 and the cyclone 13. All these members are stationary and do not take part in the motion of the parts to be moved when a weighing is to be made.

Finally, I wish it to be understood that it is not indispensably requisite to raise the drum from below. The arrangement and combination of the parts effecting the raising and lowering of the drum may be such as to be effected from above, for instance by means of ropes or chains with the requisite co-operating parts, such as disks or pulleys or the like.

I claim:

In an apparatus for manufacturing bronze powder, in combination with a drum containing a large number of small steel balls adapted to be raised and dropped in said drum, means for rotating said drum, means for continually feeding the metal to be comminuted to said drum, an inlet conduit intermediate said feeding means and said drum being airtightly connected to said drum, an outlet conduit on said drum being airtightly connected thereto, a sifting means, a conduit leading thereto from said outlet conduit, a blower causing a current of air to pass through said drum for continually carrying away from said drum the beaten powder particles through said outlet conduit, a support, a frame rotatably supporting said drum and releasably connected to said support, a scale comprising a scale-beam and a weighing pan suspended from one arm of said scale-beam, and a link connecting the other arm of said scale-beam with said frame.

ERWIN KRAMER.